United States Patent [19]
Maunsell et al.

[11] 3,815,042
[45] June 4, 1974

[54] DUAL MODE PHASE LOCKED LOOP

[76] Inventors: Henry Ian Geoffery Maunsell, R.D. No. 1, Mountainside Dr., Colts Neck, N.J. 07722; John Brennan Millard, 23 Edgewood Dr., Matawan, N.J. 07747; John William Pan, 13 Parkway Pl., Holmdel, N.J. 07733; John Jeffrey Schottle, 111 Harbor Green Cir., Red Bank, N.J. 07701

[22] Filed: May 21, 1973

[21] Appl. No.: 362,256

[52] U.S. Cl. .................................. 331/11, 331/1 A
[51] Int. Cl. .............................................. H03b 3/04
[58] Field of Search .............................. 331/11, 1 A

[56] References Cited

FOREIGN PATENTS OR APPLICATIONS 799,016 11/1968 Canada ................................ 331/11

*Primary Examiner*—John Kominski
*Attorney, Agent, or Firm*—Daniel D. Dubosky

[57] ABSTRACT

Input pulses and feedback pulses from a voltage-controlled oscillator are each divided by first and second factors. A first phase comparator, combined with a low-pass filter, affords a standard sawtooth-shaped voltage versus phase difference characteristic. Versions of the input and feedback pulse signals which are divided by the first and second factors are coupled to this first phase comparator. A logic circuit responsive to the pulses in the feedback circuit divided by both factors produces a distinctive pulse signal which is compared at a second phase comparator with the version of the input pulses divided by both the first and second factors. The second phase comparator, combined with a phase lag filter, produces a transfer characteristic which is linearly increasing in a center range and which assumes constant values above and below that range. The filtered phase error signals are combined and coupled to the input of the voltage-controlled oscillator.

13 Claims, 12 Drawing Figures

DUAL MODE PHASE LOCKED LOOP

BACKGROUND OF THE INVENTION

This invention relates to timing extraction circuitry for digital transmission systems. More particularly, it relates to phase locking apparatus.

Phase locked loops are useful for systems having message-bearing digital signals with timing and framing information slotted therein. The transmitter apparatus of such systems inserts varying amounts of timing information into the coded message-bearing signal, thereby providing sufficient material for the receiving apparatus to reconstruct and synchronize information as received. Once the receiver has synchronized its operation in harmony with the transmitter and encoder, the timing information is of no further utility, and the next task is to reinstate the encoded message signal to its original digital rate prior to decoding and utilization.

Phase locked loops perform this task by utilizing feedback from a voltage-controlled oscillator, a voltage representative of the phase difference between the encoded message signal and the signal so fed back being filtered and applied to the voltage-controlled oscillator; that is, the oscillator input, which is a voltage directly proportional to the difference in phase between the respective inputs of the phase comparator, causes a proportional perturbation in the output frequency of the oscillator. The output of the oscillator in turn furnishes the fed back signal for the phase comparator. The theory and operation of basic phase locked loops is described in great detail in Phaselock Techniques, by Floyd M. Gardner, Wiley, New York, 1967.

Since the sensing of phase error and the voltage production in reaction thereto is conducted by the phase comparator, it is clear that the characteristic response of the whole loop largely is established by the operational characteristic and sensitivity of the comparator. In this regard, a dichotomy arises as to performance goals and the implications of their realistic achievement. Clearly, the steeper the curve of output voltage versus input phase difference for a phase comparator, the more quickly a loop can achieve locking. It is apparent, however, that the other loop components have operational voltage limits above which saturation phenomena occur. Hence, unless the loop is to be sensitive only to a narrow range of phase differences, the steepness of the voltage versus phase difference characteristic curve must be reduced in order to accommodate broader ranges of phase disparity.

The prior art approach to this dichotomy has been to afford double loop apparatus with dual mode characteristics. In such apparatus, the two loops operate in a disjoint fashion, with one loop operating only for broad phase disparities and the other only for lesser disparities. In one class of prior art dual mode loops, one loop has a frequency detector, rather than a phase detector, which operates until frequency locking is substantially achieved, at which time a standard basic loop having a phase comparator takes over and brings the signal into phase lock. In another class, one standard phase detector having narrow band response is used in one loop, while a dead phase detector is used in the other. Both detectors operate in response to pulses which locate the occurrence of a slot where timing information has been extracted.

It is an object of the present invention to afford dual mode locking without requiring either frequency detectors or mutually exclusive phase detectors responsive to the presence of timing bursts.

SUMMARY OF THE INVENTION

The present invention provides a dual slope pull-in characteristic by providing two separate loops, each of which operates continuously, the overall loop response being a superposition of the response characteristics of the individual loops. This superposition is accomplished by means of selective pulse frequency division and phase comparison circuitry both in the input aspect and the feedback aspect of each individual loop. In the first loop, a phase comparator having a standard sawtooth transfer characteristic of predetermined range operates in conjunction with input and feedback frequency dividers in a standard fashion. In the second loop, however, logic circuitry processes pulses from the pulse frequency dividers in the feedback circuitry such that, when combined with the phase comparison apparatus, the result is a distinctive phase difference versus voltage characteristic. More particularly, this characteristic involves a linearly variant response in a predetermined range, beyond which a flat saturation-type response is produced. Whenever the sawtooth characteristic of the first loop is combined with this distinctive characteristic of the second loop, an overall transfer characteristic results which demostrates fast pull-in for small phase difference, but which also has broad range without forcing excessive voltage constraints upon the overall configuration.

In an illustrative embodiment, input pulses are coupled to first and second pulse division circuits, and the divided-down input pulses are coupled respectively to first and second phase comparators. If the division factors are designated M and N, respectively, one divided-down pulse is coupled to the phase comparator for every MN input pulses; that is, the divided-down pulse signal has a 50 percent duty cycle with each cycle extending in duration for MN input pulses. A voltage-controlled oscillator produces pulses at a frequency dependent upon the voltage at its input, and these pulses are coupled to feedback circuitry which includes pulse-frequency division apparatus identical to that in the input branch. Hence, pulses divided down by a factor of MN are coupled to the first phase comparator. Logic means responsive to the second pulse frequency division circuit in the feedback loop produces a pulse which occurs once for every MN output pulses from the oscillator, and further which has a duration the same as the pulses from the oscillator which are divided by factor M. It is this distinctive pulse which is coupled to the second phase comparator, there to be phase-compared with the divided-down input pulses. Each of the phase comparators produces a pulse having energy proportional to the phase difference between the pulses coupled to their respective inputs; these signals are filtered and coupled to a summing amplifier. The summed signals in turn drive the voltage-controlled oscillator, thereby completing the dual loop.

It is a feature of the present invention that two separate loops are combined to yield a segmented transfer characteristic which has freely variable segment breakpoints on both the phase difference axis and on the voltage magnitude axis. This variation is achieved without resorting either to frequency detectors or to mutually exclusive band elimination phase comparators. Moreover, the necessity of burst detectors to determine the occurrence of sync and timing information is rendered unnecessary.

DETAILED DESCRIPTION

Figure 1:
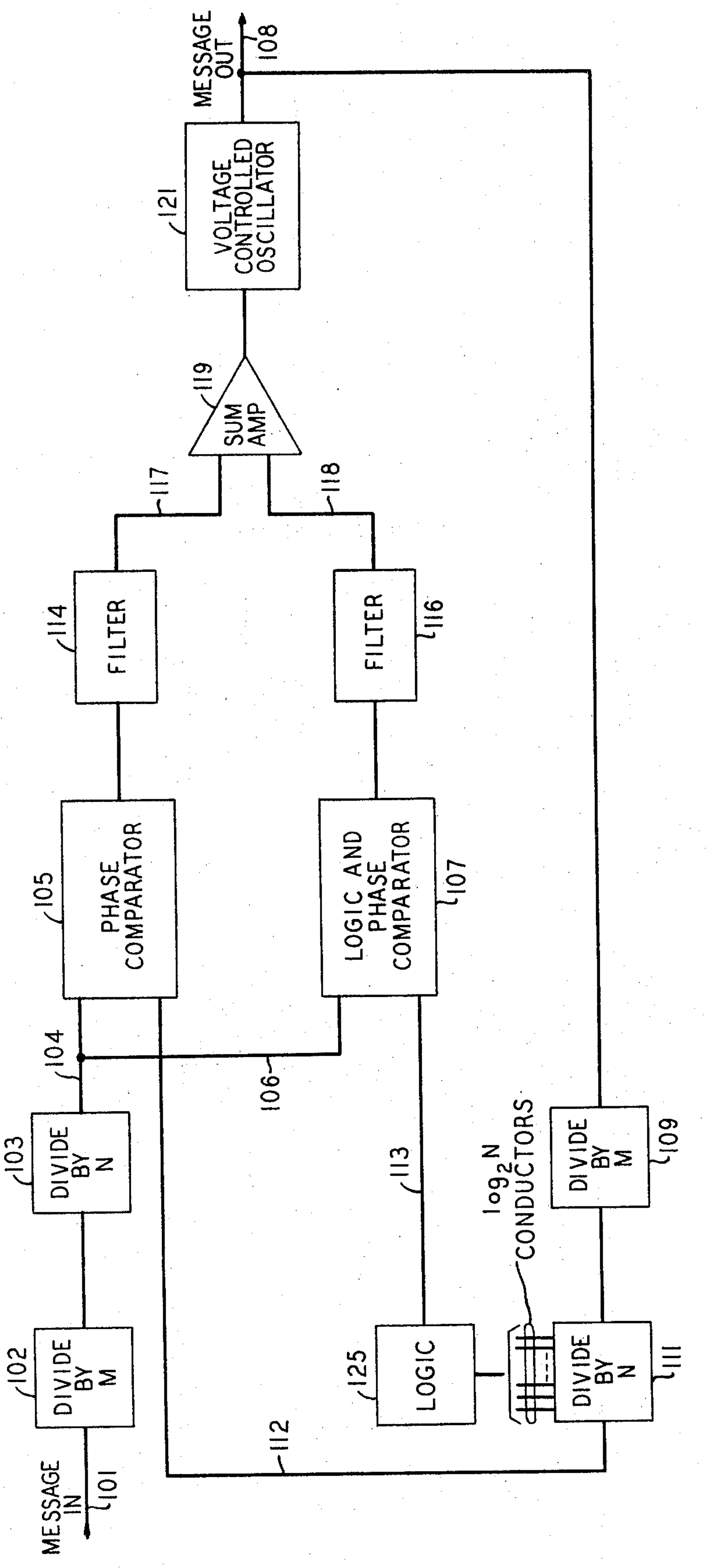
FIG. 1 shows an illustrative embodiment of the present invention in block diagrammatic form.

In FIG. 1, a message input is presented at terminal 101. It is envisioned that the message so applied to input terminal 101 has already had any timing and synchronization signals removed therefrom. Consequently, the signal at terminal 101 may be thought of as having two different frequencies: a long term frequency which represents the overall average number of pulses per unit time, and an instantaneous frequency which may be large or small depending upon whether the segment of signal in question has message bearing signal or has large openings where slotted information has been removed. It is the purpose of the embodiment of FIG. 1 to stretch the message signal out to a uniform rate, approximately equal to the average overall rate.

Figure 2A:
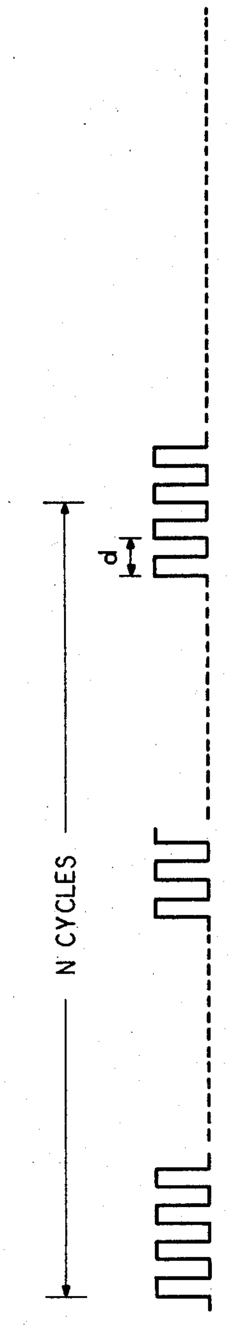
FIG. 2A through 2G show transfer characteristics which illustrate the operation of the invention.
Figure 2B:

The message presented at terminal 101 is first divided down by a pair of frequency division circuits 102 and 103. As is evidenced in the drawing, circuit 102 divides the message by a factor of "M," whereas circuit 103 further divides it by a factor of "N." The significance of these frequency divisions is as follows. For each "M" pulses which are presented at terminal 101, only a single pulse cycle, of duration equal to that of the "M" input pulses, is represented at the output of divide circuit 102. Similarly, for each "N" pulses which are presented to the input of divide circuit 103, only one is represented at its output; the period of each such divided-down pulse is equal to the duration of the "N" pulses. Hence, the pulse train produced by the "divide by N" circuit 103, which is coupled to a pair of phase comparators 105 and 107, features a single pulse cycle for each "MN" pulses of the input message signal at terminal 101. An exemplary waveform of the input pulses divided by M is shown in FIG. 2A, and an exemplary waveform of the pulses divided by MN is shown in FIG. 2B.

In FIG. 1, the two division functions are isolated into circuits 102 and 103 for the sake of symmetry with the feedback branch. Each of two phase comparators 105 and 107 has a second input terminal which is connected by means of feedback circuitry to a message output terminal 108. More particularly, the feedback link includes a pair of frequency division circuits 109 and 111, which are identical respectively to the input frequency division circuits 102 and 103. Hence, division circuit 109 operates by dividing pulses at its input by a factor of "M," whereas division circuitry 111 operates to divide pulses by "N." A logic circuit 125, the significance of which is disclosed hereinafter, is connected between divide circuit 111 and phase comparator 107.

The loop which includes the first phase comparator 105 operates as follows. At input terminals 104 and 112, two pulse waveforms, each being similar to the ones shown in FIG. 2B, are presented. Since the frequency of the voltage-controlled oscillator 121 is approximately the same as that of the message signal at input terminal 101, the two divided-down waveforms presented at terminals 104 the 112 may differ substantially only in terms of phase. The phase comparator 105 produces a pulse at its output commencing with each negative-going excursion of an input pulse from terminal 104, and terminating upon the occurrence of a similar excursion of the waveform presented at terminal 112. It is therefore clear that the total energy in the pulses produced by the first phase comparator 105 constitutes a measurement of phase disparity between respective pulse signals presented at its inputs. Since both such signals are approximately the same as the one shown in FIG. 2B, the maximum measurable phase disparity between the two signals at terminals 101 and 108 is $\pm MN\pi$.

Figure 2C:
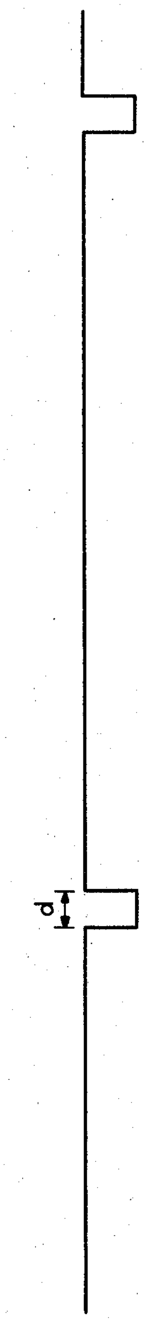
Figure 2D:
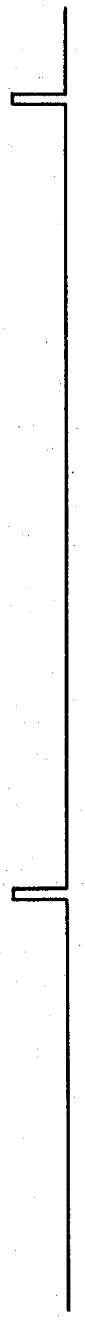

The pulses from the phase comparator 105 are coupled to a low-pass filter 114 such that the signal at line 117 has a voltage amplitude proportional to the phase difference between the pulse signals at terminals 104 and 112. Ignoring momentarily the operation of the second loop, which includes phase comparator 107, this filtered voltage is the input to the voltage-controlled oscillator 121, thereby producing a proportionate change in the output frequency of that oscillator. The transfer characteristic of the loop including the first phase comparator 105 is therefore a standard sawtooth characteristic, one example of which is shown in FIG. 2F.

The operation of the second loop, which includes the phase comparator 107, is somewhat different because of the distinctive pulse signal coupled thereto at input terminal 113. As disclosed hereinbefore, the pulse signal coupled to a first input terminal 106 of phase comparator 107 is as shown in FIG. 2B. The signal coupled at its other input terminal 113, however, is produced by a logical operation upon the pulses which have been divided by the factor "M" in circuit 109.

Figures 3A, 3D:
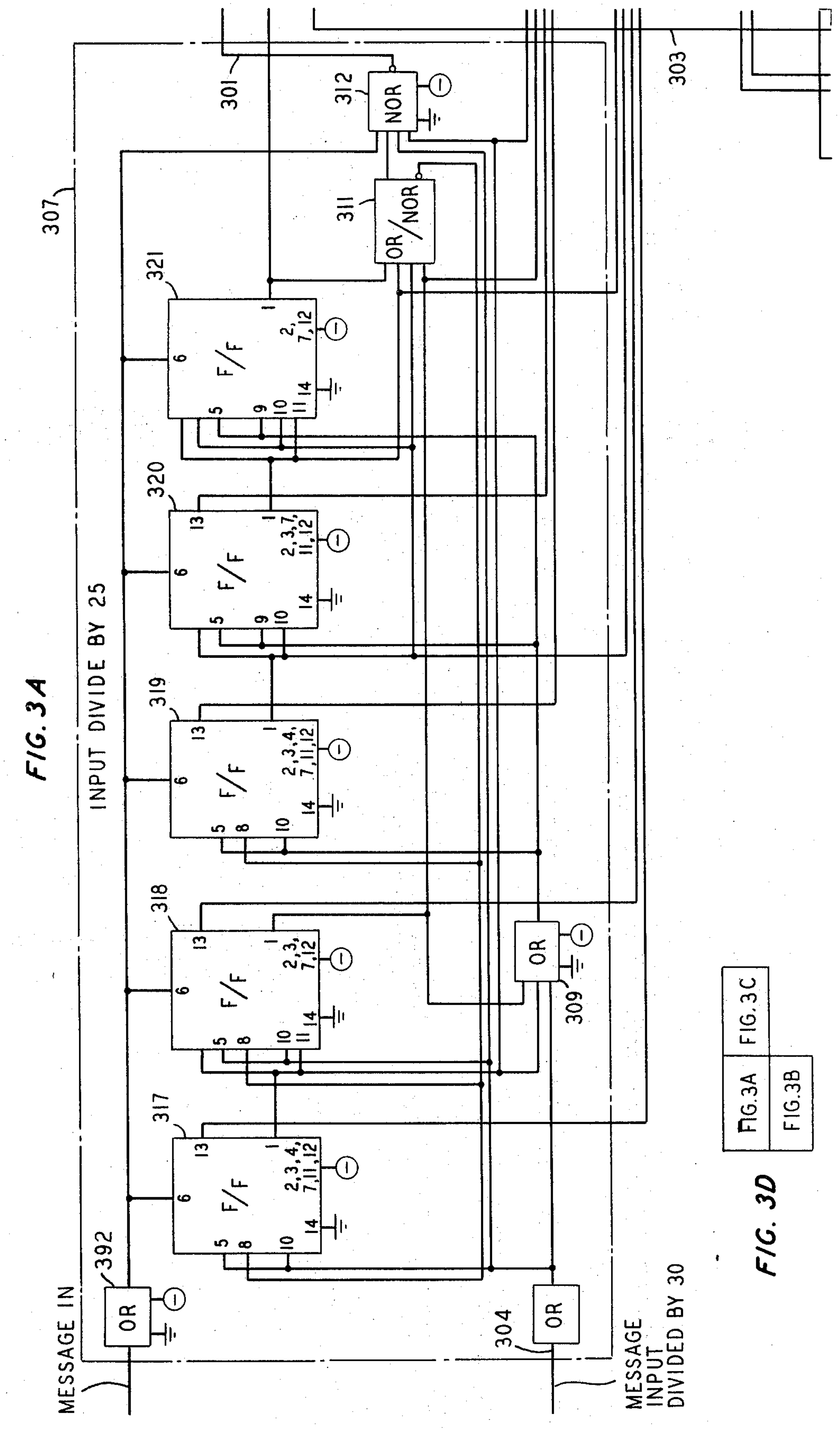
FIGS. 3A through 3C, when joined as shown in FIG. 3D, show a detailed version of the embodiment of FIG. 1.
Figure 3B:
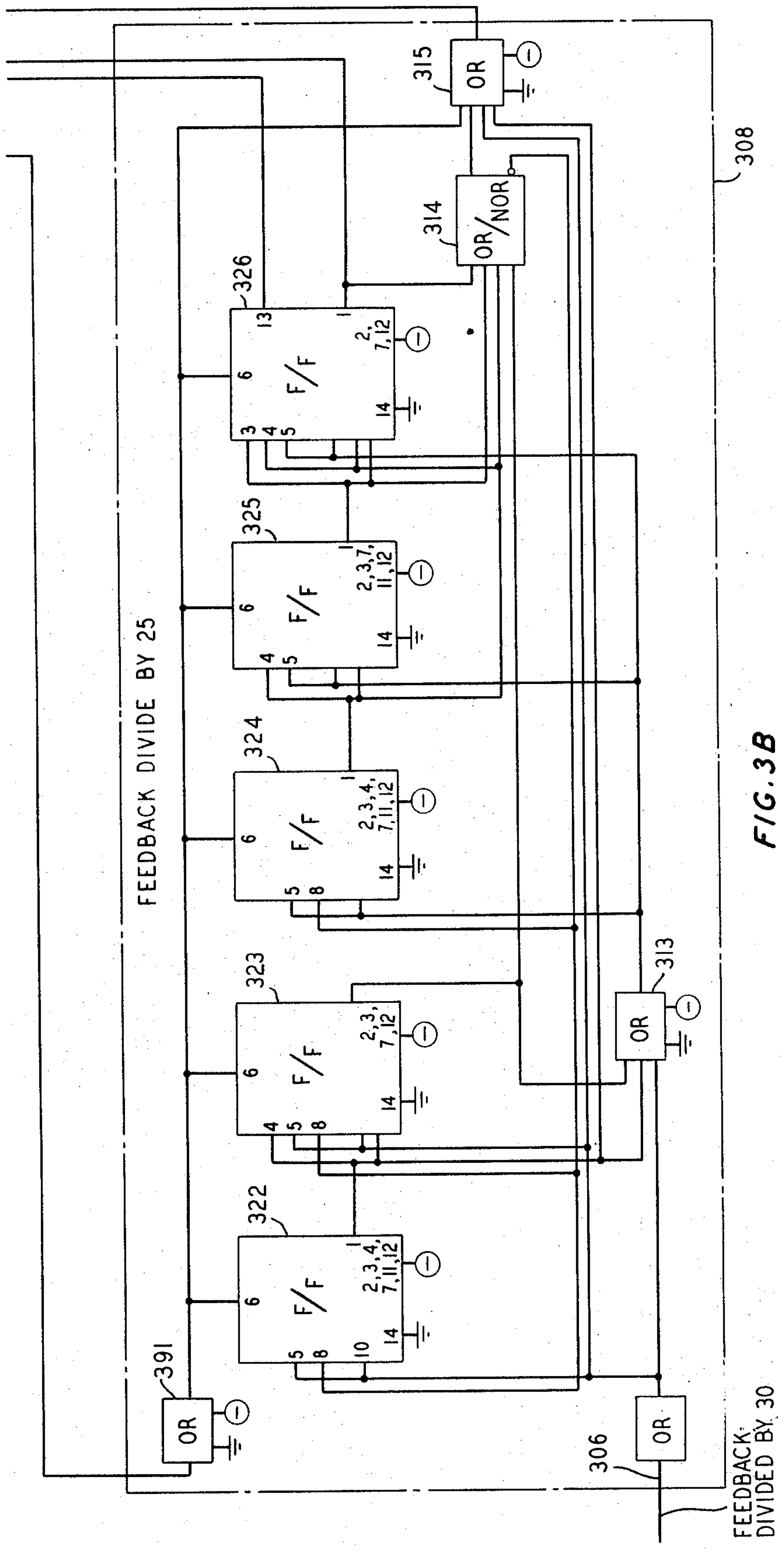
Figure 3C:
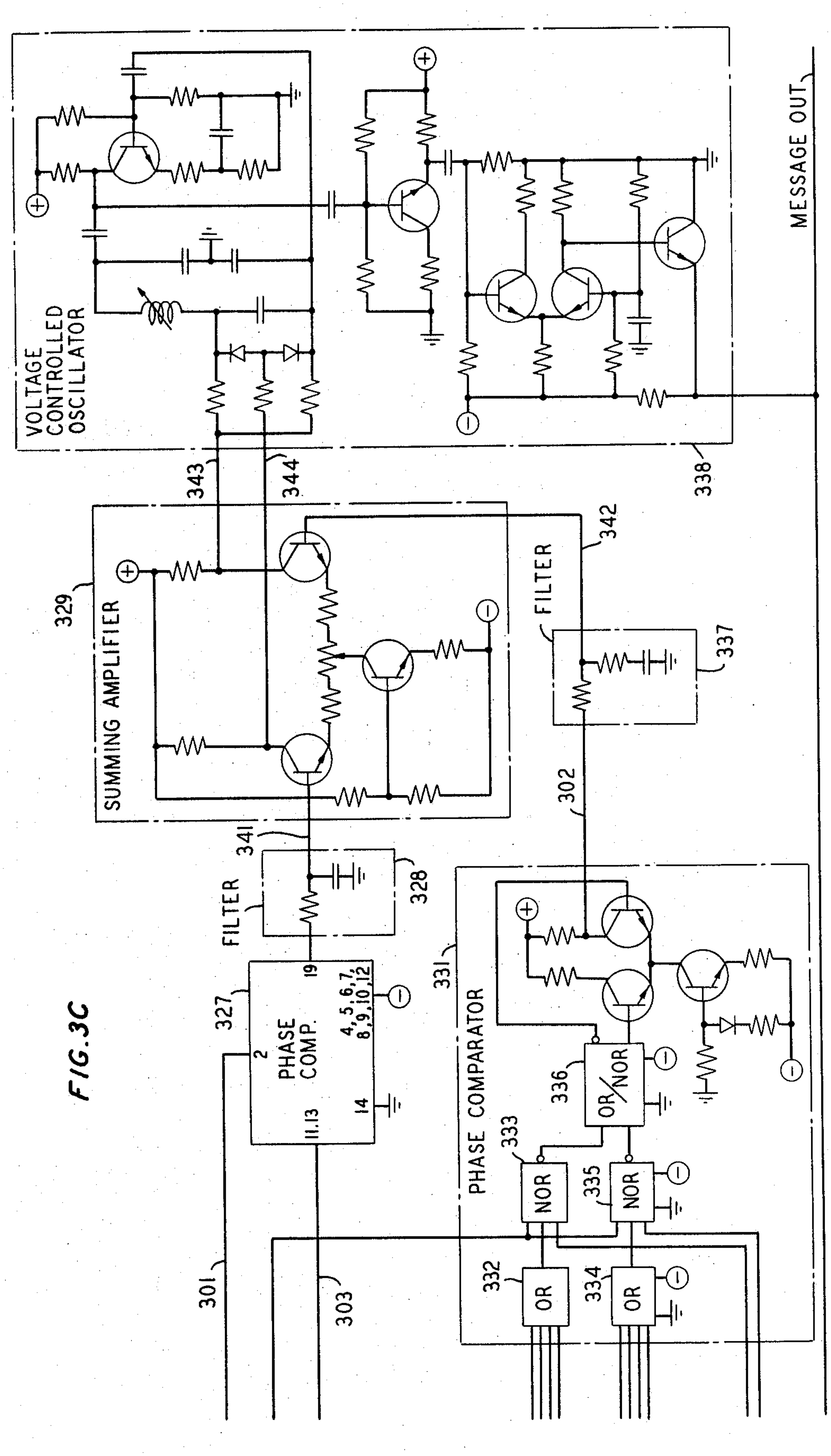

The embodiment of FIG. 1 shows a wire from each of the $\log_2 N$ stages of "divide by N" circuit 111 to the logic block 125. In accordance with the principles of the present invention, the logic circuit 125 produces a voltage waveform such as the one shown in FIG. 2C. More particularly, that waveform constitutes a series of negative-going pulses, having a periodicity of $2MN\pi$ (i.e., having one pulse occur for each "MN" pulses from the oscillator 121), but having a duration "*d*" equal to one cycle of the pulse signal divided by "M." It is clear that, alternatively, the logic circuit 125 could operate responsively to input drive by N circuit 103 rather than, as shown in FIG. 1, to the feedback divide by N circuit 111. In such case, a waveform such as shown in FIG. 2C would be coupled to input terminal 106 of comparator 107, and a waveform such as shown in FIG. 2B (as is coupled to input terminal 112 of comparator 105) would be coupled directly from divide circuit 111 to input terminal 113 of comparator 107. In any event, the transfer characteristic of the second loop is unaffected thereby. (The detailed embodiment of FIGS. 3A through 3C is just such a version.)

The second phase comparator 107 operates to compare waveforms such as that of FIG. 2B with others such as that of FIG. 2C. Basically, the comparator 107 senses the overlap of the negative-going pulses of signals coupled to its two input terminals 106 and 113. Thus, for the waveforms shown in FIGS. 2B and 2C, phase comparator 107 would produce a pulse waveform such as shown in FIG. 2D. The pulses of the FIG. 2D signal have a duration equal to, and therefore a total energy indicative of the difference between the commencement of the negative pulses of FIG. 2B and the remaining duration of the negative pulses of FIG. 2C. The comparator 107 is arranged to operate cooperatively with the logic circuit 125 such that, when there is no phase disparity between the message output at terminal 108 and the message input at terminal 101, the pulses produced by the phase comparator 107 have a duration of one-half d. So long as there is partial overlap, the energy in the pulses of FIG. 2D is linearly dependent upon the position of the pulses of FIG. 2C relative to those of FIG. 2B. Whenever there is either total coincidence or no coincidence at all, however, the output from the phase comparator 107 remains a constant positive or negative voltage.

The pulses from phase comparator 107 are coupled to a phase lag filter 116 at which their energy is integrated to produce a voltage waveform having an amplitude dependent upon the energy in the signals from comparator 107. Since the duration of each of the pulses of FIG. 2C is equal to $2M\pi$, the range of linear voltage versus phase difference extends between $-M\pi$ and $+M\pi$. Above or below those quantities no linear voltage change results. Hence, the transfer characteristic for the loop including phase comparator 107 and filter 116 is as shown in FIG. 2E.

Voltages from the filter 116 are coupled to the second input terminal 118 of the summing amplifier 119 and therefrom to the voltage-controlled oscillator 121. Thereupon, the output message signal is proportionately altered in frequency, is transmitted, and also is fed back to division circuits 109 and 111, thereby completing the phase locking loop.

Figure 2E:
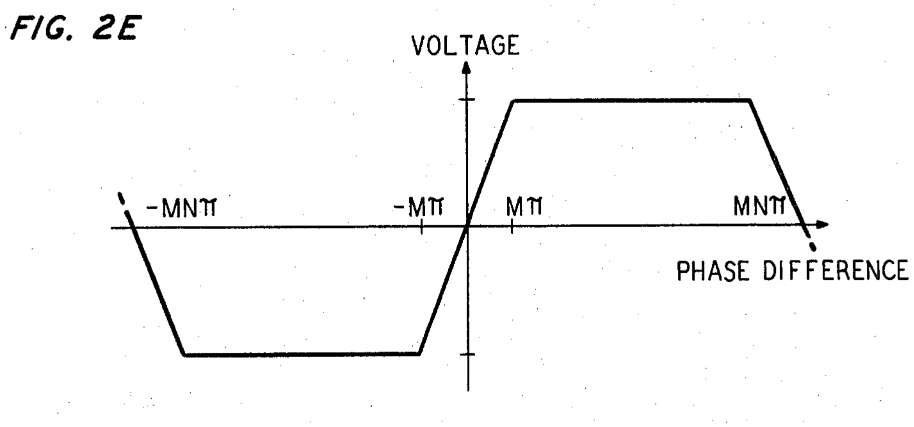
Figure 2F:
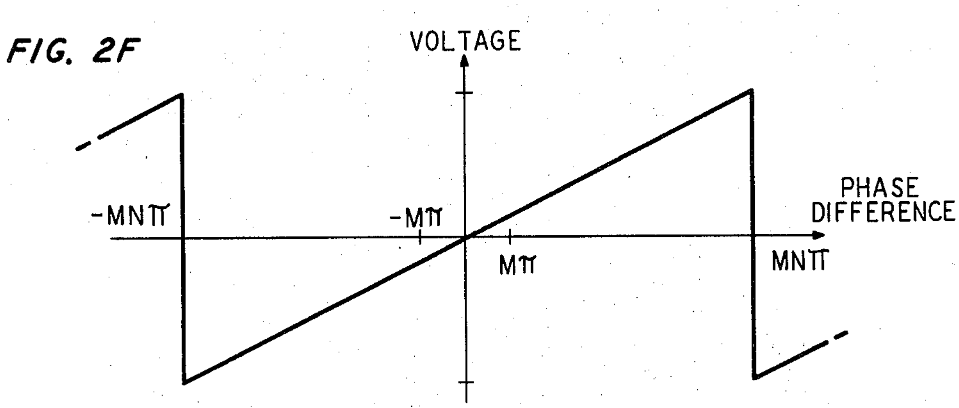
Figure 2G:
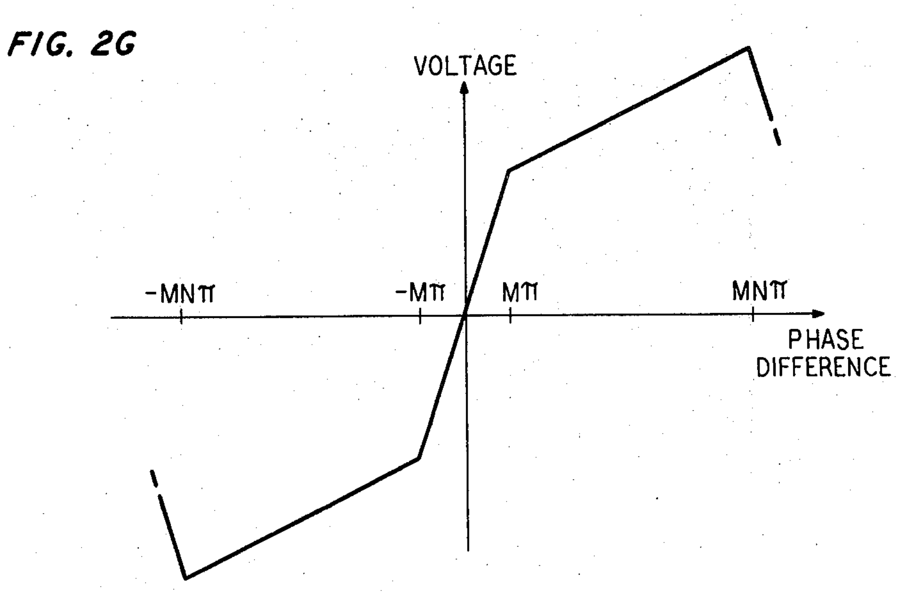

In summary, the respective loops of FIG. 1 are characterized by the transfer functions of FIGS. 2E and 2F. Since the voltages represented thereby are linearly combined at a summing amplifier 119, it is clear that the overall transfer characteristic is simply the linear combination of the respective characteristics of FIGS. 2E and 2F. The aggregate transfer characteristic of the dual mode loop of FIG. 1 is the one shown in FIG. 2G. That characteristic may be interpreted as follows. Near the origin, and extending outwardly to positive and negative $M\pi$ radians of phase difference, the voltage versus phase difference characteristic is steep. In this range, which corresponds to small phase differences, a fast pull-in and small steady state phase error is demonstrated. Beyond $\pm M\pi$, and extending outwardly to $-MN\pi$ to $+MN\pi$, a second, more gradual slope is exhibited. In this range, the chief advantage is in the breadth of input phase difference which may be resolved; in trade for this advantage, the pull-in is clearly not as rapid. Overall, however, the composite transfer function achieves satisfactory pull-in and jitter characteristics, while having the capability to resolve relatively large phase differences to quite a large degree. Moreover, the slopes and breakpoints of the aggregate characteristics are freely variable by choice of the factors M and N, and also by adjustment of the gain of comparators 105 and 107.

Prior to a detailed discussion of the embodiment of FIGS. 3A and 3B embodiment, it is instructive to consider the nature of pulse counting and pulse division circuitry. In FIG. 1, four separate blocks 102, 103, 109 and 111 provide pulse division functions. These functions are quite well known in the art, and may be embodied by apparatus well known in the art. See, for example, Chapter 18 of Pulse, Digital, and Switching Waveforms, Millman and Taub, McGraw-Hill, 1965. In particular, it is convenient to embody the division circuits 102, 103, 109 and 111 as chains of flip-flops such as those shown at page 669 of that text. The resulting pulse waveforms, which are shown in FIG. 18-2 thereof, are clearly of the type called for in FIGS. 2A and 2B hereof.

FIGS. 3A through 3C show detailed embodiments of the FIG. 1 apparatus, with the exception that the "divide by M" blocks 102 and 109 of FIG. 1 are omitted from the embodiment of FIGS. 3A through 3C. Therefore, as pulses are received at terminals 304 and 306, the respective message input and output signals already have been divided by the factor M. In FIGS. 3A through 3C, the factors M and N are respectively defined to be 30 and 25. Hence, in the resulting composite transfer characteristic of FIG. 2G, the phase difference break points would occur at $-750\pi$, $-50\pi$, $50\pi$ and $750\pi$.

For the sake of clarity, the divide by 25 circuits 103 and 111 are detailed by blocks 307 and 308 of FIGS. 3A and 3B. Those blocks include a plurality of flip-flops 317 through 326, each of which is embodied as Motorola 1013P flip-flop integrated circuits, or, alternatively, as similarly appropriate apparatus. The numbers within the blocks represent the labels of terminals of the 1013P units. As shown, the flip-flops are connected in series such that a successive pulse counting operation is achieved. Since a standard binary count through five flip-flops results in a total count of $2^5$ or 32, it is necessary to combine the flip-flops in each of the counters 307 and 308 with selective logic circuitry in order to achieve the desired count of 25. This technique also is detailed in the Millman and Taub reference. In the input divide circuit 307, gates 309 through 312 achieve this function, and in the feedback divide circuit, gates 313 through 315 do the same. Accordingly, the divided by 30 message input which is received at terminal 304 is further divided by 25 and coupled to line 301. Likewise, the divided by 30 feedback signal at line 306 is further divided by 25, and is coupled to line 303.

The fully divided input and message waveforms are thereupon coupled to a phase comparator 327 which is also embodied as a 1013P flip-flop. This comparator 327 constitutes the first phase comparator 105 of FIG. 1 and produces, in conjunction with a low-pass filter 328, the sawtooth shaped voltage versus phase difference transfer characteristic shown in FIG. 2F, with phase difference breakpoints of $-750\pi$ and $750\pi$. The flip-flop 327 is set by a pulse at line 301 and is clocked by a pulse at line 303, so the output thereof is a pulse having a duration equal to the phase difference between the respective input pulses. In the absence of a pulse stream at line 301, the flip-flop 327 will toggle at a rate commensurate with the pulse input at line 303. The lowpass filter 328 extracts the energy from these pulses, thereby producing a voltage amplitude which is proportional to the detected phase difference. This voltage is coupled to a first input terminal 341 of a differential summing amplifier 329. Clearly, the operation of the input division circuits 307 and 308 in conjunction with the phase comparator 327 and the low-pass filter 328 corresponds exactly to the foregoing operation of the first loop of the embodiment of FIG. 1.

In FIG. 3B, the message output from a voltage-controlled oscillator 338 is coupled back to the feedback division circuit 308 via an OR gate 391 for timing purposes only. (The undivided message input is also coupled to divide circuit 307 via an OR gate 392 for similar purposes.) Once the oscillator output signal has been divided by 30, and as it is coupled to division block 308 to be divided by 25 thereby, the logic operation represented in FIG. 1 by logic block 125 must be accomplished in order to produce a waveform such as shown in FIG. 2C. In FIGS. 3A through 3C, the logical operations hereinbefore ascribed to blocks 125 and 107 are merged into a phase comparator block 331 which is connected at a first input to the input divide by 25 circuit 307. This may be recognized as the alternate configuration of the logic circuit 125 referred to hereinbefore. That block includes a series of OR and NOR gates 332 through 336 along with a differential amplifier. Those gates, and all others in FIGS. 3A through 3C are embodied as Motorola 1004P integrated circuit dual OR/NOR gates, or as other similarly appropriate apparatus. Phase comparator 331 produces the reference pulse signal of FIG. 2C, synchronizes it with that of FIG. 2B, and performs the actual phase comparison operation, producing a phase error signal such as the one shown in FIG. 2D. The logic configuration of FIG. 3A produces a waveform such as shown in FIG. 2C, with added provision for further pulses interleaved between the pulses shown. These interleaved pulses merely double the gain of the second comparator 331, but otherwise do not affect the principles of the present invention.

At line 302, the phase error signal of FIG. 2D is coupled to a phase lag filter 337 where its energy is extracted, thereby producing a voltage proportional to the energy of the error pulses. This voltage is coupled to a second input terminal 342 of the differential summing amplifier 329. That amplifier, which represents a configuration well known in the art, sums the voltages coupled to its input and in turn passes the summed voltage to the input terminals 343 and 344 of a voltage-controlled oscillator 338. The oscillator configuration, which also is well known in the art, produces an output pulse signal having a frequency proportional to the voltage received by its input. In turn, the oscillator output is used as output and as a feedback signal as described hereinbefore.

For more detail about the makeup and the terminal designations for the Motorola integrated circuit flip-flops and gates, reference may be made to pages 14-10 and 14-11 of The Semiconductor Data Book, third edition, published in 1968 by Motorola, Inc., or to others of the various commercial manuals similarly available to the public. It may be noted that the 1004P gates provide dual OR and NOR functions, with the respective output quantities appropriately represented either by an inverting or a noninverting output terminal. It is clear that the gates might alternatively be embodied by separate OR and NOR functions.

What is claimed is:

1. Apparatus for establishing a predetermined phase relationship among pulses of a message signal comprising:

first means for frequency dividing the message signal by first and second factors, respectively designated M and N;

a voltage-controlled oscillator;

second means for frequency dividing an output wave from said oscillator by said first and second factors;

means responsive to said first and second frequency dividing means, for producing a first phase error signal having energy directly proportional to phase difference for differences in the range $-MN\pi$ to $+MN\pi$ radians;

means, responsive to said first and second frequency dividing means, for producing a second phase error signal having a first predetermined energy for phase differences in the range $-MN\pi$ to $-M\pi$ radians, having a second predetermined energy for phase differences in the range $M\pi$ to $MN\pi$ radians, and having an energy directly proportional to phase difference in the range $-M\pi$ to $+M\pi$ radians; and means for combining said first and second error signals to control said voltage-controlled oscillator.

2. Apparatus as described in claim 1 wherein said means for producing a first error signal comprises:

a first phase comparator for producing pulses having duration equal to phase difference between versions of said message signal and the output wave of said oscillator which are successively divided by said first and second factors; and filtering means for integrating pulses from said first phase comparator, the amplitude of the filtered signal representing said first error signal.

3. Apparatus as described in claim 2 wherein said first phase comparator includes a set-reset type of bistable multivibrator.

4. Apparatus as described in claim 2 wherein said filtering means includes a low-pass filter made up of at least one resistor and at least one capacitor.

5. Apparatus as described in claim 1 wherein said means for producing a second error signal includes:

logic means, responsive to said second means for frequency dividing, for producing a signal having a periodicity of $2MN\pi$ and having pulses of duration $2M\pi$;

a second phase comparator for producing pulses having duration which indicates the phase difference between signals from said first means for dividing and the signal produced by said logic means; and filtering means for integrating pulses from said second phase comparator, the amplitude of the filtered signal representing said second error signal.

6. Apparatus as described in claim 5 wherein said second phase comparator includes means for detecting the overlap of pulses from said logic means with pulses from said first means for dividing.

7. Apparatus as described in claim 5 wherein said filtering means comprises a phase lag filter including a first resistor connected directly between input and output ports; and a series connection of a capacitor and a second resistor between said first resistor and ground potential.

8. Apparatus as described in claim 1 wherein said means for frequency dividing the message signal includes:

first logic means for producing a pulse upon the occurrence of a first predetermined number of message signal pulses; and second logic means for producing a pulse having the duration of a second predetermined number of pulses from said first logic means.

9. Apparatus as described in claim 1 wherein said means for combining includes a differential summing amplifier.

10. Apparatus for establishing a predetermined phase relationship between pulses of a message signal and pulses at an output of a voltage-controlled oscillator, said apparatus comprising first and second frequency dividing means for providing a frequency division by a factor of MN of the pulses provided at their respective inputs, means for coupling said message signal to the input of said first frequency dividing means, means for coupling the output of said voltage-controlled oscillator to the input of said second frequency dividing means, a first phase comparator means for providing a first error signal in response to the outputs of said first and second frequency dividing means, a second phase comparator means having two inputs for providing a second error signal in response to signals presented to its two inputs, means for coupling the output of one of said frequency dividing means to one of the inputs of said second phase comparator means, logic means responsive to logical states in the other one of said two frequency dividing means for developing a signal pulse having a pulse duration of MT where T is equal to the period of pulses at the input of said other one of said two frequency dividing means, means for coupling said signal pulse to the other one of said two inputs of said second phase comparator means, and means for combining said first and second error signals as an input to said voltage-controlled oscillator.

11. Apparatus as described in claim 10 wherein said first phase comparator means includes bistable multivibrator means, responsive to said first and second frequency dividing means, for producing a signal having pulses of duration proportional to phase difference between associated input and feedback signals divided by MN, and filter means for producing a signal having an amplitude proportional to energy of pulses from said bistable multivibrator means.

12. Apparatus as described in claim 10 wherein said second phase comparator means includes means for producing a signal having pulses of duration proportional to phase difference between associated input signals, and filter means for producing a signal having an amplitude proportional to energy of pulses from said bistable multivibrator means.

13. Apparatus as described in claim 10 wherein said means for combining includes a differential summing amplifier.

* * * * *

UNITED STATES PATENT OFFICE
CERTIFICATE OF CORRECTION

PATENT NO. : 3,815,042

DATED : June 4, 1974

INVENTOR(S) : Henry I. G. Maunsell, John B. Millard, John W. Pan and John J. Schottle It is certified that error appears in the above-identified patent and that said Letters Patent are hereby corrected as shown below:

Please add Bell Telephone Laboratories, Incorporated, Murray Hill, New Jersey, as Assignee, on the printed Patent. This has been inadvertently omitted by the Patent Office.

Col. 1, line 64, after "dead" insert --band--.

Col. 4, line 8, after "104" delete "the" and substitute therefor --and--;

line 55, after "input" delete "drive" and substitute therefor --divide--.

Signed and sealed this 27th day of May 1975.

(SEAL)
Attest:

RUTH C. MASON
Attesting Officer

C. MARSHALL DANN
Commissioner of Patents and Trademarks